3,285,917
PRODUCTION OF PYRAZINES
Walter H. Brader, Jr., Austin, Tex., assignor to Jefferson Chemical Company, Inc., Houston, Tex., a corporation of Delaware
No Drawing. Filed Oct. 21, 1963, Ser. No. 317,820
4 Claims. (Cl. 260—250)

This invention relates to a method for the production of pyrazines. More particularly, this invention relates to a catalytic vapor phase method for the production of pyrazine.

It has heretofore been proposed to use silica alumina as a catalyst for the production of heterocyclic compounds from N-alkylpiperazines. For example, in Herrick U.S. Patent No. 2,937,176 there is disclosed a method for the production of diazabicyclo-(2.2.2)-octane, sometimes referred to as triethylenediamine, from N-aminoethylpiperazine. As another example, in Brader U.S. Patent No. 3,056,788 there is disclosed a method for the production of triethylenediamine from N-aminoethylpiperazine in the presence of a tungsten oxide catalyst.

In contradistinction to the foregoing teachings of the prior art, it has now been discovered that pyrazines can be prepared, in preference to triethylenediamines, when silica alumina or tungsten oxide (as such, or supported on an alumina support) is utilized as a catalyst.

The feed stock for the present invention is a compound having the formula:

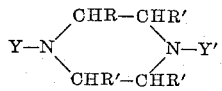

Wherein Y is —$CH_2$—$CH_2$—X;
Wherein Y' is H or —$CH_2$—$CH_2$X;
Wherein X is selected from the group consisting of hydroxy and amino;
Wherein one of R is selected from the group consisting of $C_1$–$C_{12}$ alkyl, cycloalkyl, aryl, alkaryl, and aralkyl; and,
Wherein R' is selected from the group consisting of H and R.

Representative examples of suitable feed compounds falling within the above definition that can be used alone or in admixture include compounds such as N-hydroxyethyl-3-methylpiperazine,
N-aminoethyl-3-methylpiperazine,
N-hydroxyethyl-3-ethylpiperazine,
N-aminoethyl-3-ethylpiperazine,
N-hydroxyethyl-3-propylpiperazine,
N-aminoethyl-3-propylpiperazine,
N-hydroxyethyl-3-n-butylpiperazine,
N-hydroxyethyl-3-isobutylpiperazine,
N-hydroxyethyl-3-cyclohexylpiperazine,
N-hydroxyethyl-3-hexylpiperazine,
N-hydroxyethyl-3-phenylpiperazine,
N-hydroxyethyl-tolylpiperazine,
N-hydroxyethyl-3-ethylphenylpiperazine,
N-hydroxyethyl-3-phenethylpiperazine, etc.
the corresponding 2-substituted piperazines,
the corresponding N-aminoethyl-2-piperazines,
the corresponding N-aminoethyl-3-piperazines,
and the corresponding N,N'-dihydroxyethyl,
N,N'-diaminoethylpiperazines,
N-hydroxyethyl-2,5-dimethylpiperazine,
N-hydroxyethyl-2,5-diethylpiperazine,
N-hydroxyethyl-2,5-dipropylpiperazine,
N-hydroxyethyl-2,5-dihexylpiperazine,
N-hydroxyethyl-2,5-didodecylpiperazine,
N-hydroxyethyl-2,5-dicyclohexylpiperazine,
N-hydroxyethyl-2,5-diphenylpiperazine,
N-hydroxyethyl-2,3,5-trimethylpiperazine,
N-hydroxyethyl-2,3,5-triethylpiperazine,
N-hydroxyethyl-2,3,5,6-tetramethylpiperazine,
N-hydroxyethyl-3-methylpiperazine,
N-hydroxyethyl-3- ethylpiperazine,
N-hydroxyethyl-3-propylpiperazine,
N-hydroxyethyl-3-butylpiperazine, etc.

The catalyst to be employed in accordance with the present invention may be a silica-alumina catalyst such as one containing from about 3 to 20 wt. percent of alumina and, correspondingly, from about 97 to about 80 wt. percent of silica, or it may be tungsten oxide.

It is also desirable to employ ammonia as a coreactant; from about 1 to about 15 mols of ammonia per mol of piperazine-type feed stock being utilized. More preferably, from about 3 to about 10 mols of ammonia per mol of piperazine-type feed stock is employed.

The reaction is suitably carried out at a temperature within the range of from about 250° to about 600° C., and more preferably at a temperature within the range of about 350° to about 450° C., such as a temperature within the range from about 375° to about 425° C.

The reaction is preferably run at atmospheric pressure although subatmospheric or superatmospheric pressures may be employed, if desired.

The invention will be further illustrated by the following specific examples which are given by way of illustration and not as limitations of the scope of this invention.

*Example I*

The reaction was carried out in a cylindrical stainless steel reactor fitted with a jacket containing a polyphenyl heat exchange medium for temperature control. The reaction was conducted by pumping N-hydroxyethyl-3-methylpiperazine into the top of the reactor while maintaining atmospheric pressure. The reactor contained about 100 grams of a silica-alumina catalyst containing about 87 wt. percent of silica and about 13 wt. percent of alumina. The reactor effluent which passed through the bottom of the reactor was collected and distilled. A fraction boiling above 100° C. to about 200° C. was taken and there was also taken a higher boiling fraction under vacuum in order to recover unreacted feed stock. The two fractions were then examined by vapor phase chromatography for constituent analysis. The reaction temperature was about 405° C., the feed rate was about 0.27 gram of feed stock per gram of catalyst per hour and the ammonia charge rate was about 0.1 gram of ammonia per gram of catalyst per hour.

On the analysis it was found that about 100% conversion of the feed stock had been obtained and that the predominant reactions that had occurred were cracking and disproportionation reactions resulting in a product containing pyrazine and methyl-substituted pyrazines in about a 40% yield. A 3 wt. percent yield of triethylenediamine and a 2 wt. percent yield of C-methyl triethylenediamine were also noted.

*Example II*

In essentially the same manner as in the preceding example, N-hydroxyethyl-3-methylpiperazine was converted over a catalyst consisting of 10 wt. percent of tungsten oxide supported on gamma alumina. The weight/hourly/space velocity of the N-hydroxyethyl-2-methylpiperazine and ammonia were 0.22 and 0.1, respectively. The reaction temperature was about 400° C.

The analysis of the reaction product showed substantially complete conversion of the feed stock and a yield of pyrazine and methyl pyrazines in excess of about 40 wt. percent. A 1 wt. percent yield of C-methyl triethylenediamine and a 3 wt. percent yield of triethylenediamine were also noted.

Equivalent results are obtainable with N-amino-ethyl-3-methylpiperazine and N-hydroxyethyl-3-ethylpiperazine.

In contrast to the foregoing, in Brader U.S. Patent No. 3,056,788, with N-aminoethylpiperazine and equivalent reaction conditions, it is reported that the yield of triethylenediamine is about 20 wt. percent. This was likewise the case with respect to Herrick U.S. Patent No. 2,937,176.

Having thus described my invention, what is claimed is:

1. A method for the production of pyrazines which comprises contacting a feed stock with a tungsten oxide catalyst at a temperature within the range of about 250° to about 600° C. and in the presence of from about 1 to about 15 mols of ammonia per mol of feed stock, said feed stock having the formula:

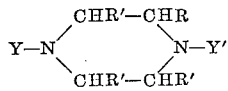

Wherein R is selected from the group consisting of $C_1$–$C_{12}$ alkyl, cycloalkyl, aryl, alkaryl and aralkyl;

Wherein R' is selected from the group consisting of H and R;

Wherein Y is —$CH_2CH_2X$;

Wherein Y' is selected from the group consisting of H and Y; and

Wherein X is selected from the group consisting of —OH and —$NH_2$.

2. A method as in claim 1 wherein R is methyl and R' is H.

3. A method as in claim 2 wherein the catalyst is tungsten oxide.

4. A method for the production of pyrazines which comprises the steps of contacting a compound selected from the group consisting of N-hydroxyethyl-3-methylpiperazine, N - aminoethyl-3-methylpiperazine, and mixtures thereof, with a tungsten oxide catalyst in the presence of from about 3 to about 10 mols of ammonia per mol of feed stock at a temperature within the range of from about 350° to about 450° C.

References Cited by the Examiner

UNITED STATES PATENTS

| | | | |
|---|---|---|---|
| 2,474,781 | 6/1949 | Dixon | 260—250 |
| 2,937,176 | 5/1960 | Herrick | 260—250 |

NICHOLAS S. RIZZO, *Primary Examiner.*

HENRY R. JILES, *Examiner.*